US009928646B2

(12) United States Patent
Chew et al.

(10) Patent No.: US 9,928,646 B2
(45) Date of Patent: Mar. 27, 2018

(54) RENDERING HIERARCHICAL VISUALIZATIONS OF DATA SETS

(71) Applicant: Longsand Limited, Cambridge (GB)

(72) Inventors: Tung Jin Chew, Cambridge (GB);
Sean Blanchflower, Cambridge (GB);
Brian Beckett, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 0 days.

(21) Appl. No.: 14/906,339

(22) PCT Filed: Jul. 31, 2013

(86) PCT No.: PCT/EP2013/066126
§ 371 (c)(1),
(2) Date: Jan. 20, 2016

(87) PCT Pub. No.: WO2015/014400
PCT Pub. Date: Feb. 5, 2015

(65) Prior Publication Data
US 2016/0171764 A1 Jun. 16, 2016

(51) Int. Cl.
*G06T 15/30* (2011.01)
*G06T 17/20* (2006.01)
(Continued)

(52) U.S. Cl.
CPC ........ *G06T 17/20* (2013.01); *G06F 17/30991* (2013.01); *G06T 11/001* (2013.01);
(Continued)

(58) Field of Classification Search
None
See application file for complete search history.

(56) References Cited

U.S. PATENT DOCUMENTS 7,271,804 B2 9/2007 Evans
2003/0050906 A1* 3/2003 Clifton-Bligh ....... G06F 3/0481
(Continued)

FOREIGN PATENT DOCUMENTS

| CN | 101873608 | 10/2010 |
|---|---|---|
| CN | 103037381 | 4/2013 |
| CN | 103336783 | 10/2013 |

OTHER PUBLICATIONS

Daniela Oelke et al: "Visual Opinion Analysis of Customer Feedback Data", Visual Analytics Science and Technology, 2009. VAST 2009. IEEE Symposium On, IEEE. Piscataway, NJ, USA. Oct. 12, 2009 (Oct. 12, 2009), pp. 187-194, XP031566657, ISBN: 978-1-4211-5283-5 Abstract; figure 4.
(Continued)

*Primary Examiner* — Xiao Wu
*Assistant Examiner* — Mohammad H Akhavannik

(57) ABSTRACT

Example implementations relate to rendering a visualization of a data set. In example implementations, a device causes a first plurality of geometric shapes to be generated. The first plurality of geometric shapes may correspond to a first plurality of topics at a first hierarchical level of the data set. The device may cause the first plurality of shapes to be arranged in a tessellation. Sizes of the first plurality of geometric shapes in the tessellation may be based on a ranking or importance of the corresponding first plurality of topics.

18 Claims, 10 Drawing Sheets

(51) Int. Cl.
*G06T 11/20* (2006.01)
*G06T 11/00* (2006.01)
*G06T 11/60* (2006.01)
*G06T 17/00* (2006.01)
*G06F 17/30* (2006.01)

(52) U.S. Cl.
CPC ............ *G06T 11/206* (2013.01); *G06T 11/60* (2013.01); *G06T 17/005* (2013.01); *G06T 2207/20016* (2013.01)

(56) References Cited

U.S. PATENT DOCUMENTS

| | | | |
|---|---|---|---|
| 2009/0327259 A1 | 12/2009 | Smith | |
| 2010/0088273 A1* | 4/2010 | Donaldson | G06Q 10/10 707/609 |
| 2010/0302279 A1* | 12/2010 | Sud | G06T 11/206 345/660 |
| 2011/0113385 A1* | 5/2011 | Sayers | G06F 17/30873 715/853 |
| 2012/0278321 A1 | 11/2012 | Traub et al. | |
| 2012/0290988 A1 | 11/2012 | Sun et al. | |
| 2013/0080978 A1 | 3/2013 | Kakde et al. | |
| 2013/0275527 A1* | 10/2013 | Deurloo | H04L 51/32 709/206 |

OTHER PUBLICATIONS

M Balzer et al: "Voronoi Treemaps", IEEE Symposium on Information Visualization, 2005. INFOVIS 200., Oct. 23, 2005 (Oct. 23, 2005), pp. 49-65, XP055116075, DOI: 10.1109/INFVIS.2005.1532128 ISBN: 978-0-78-039464-3 Abstract; figures 4, 10-12 Section 3.; pp. 51-53.

PCT; "Notification of Transmittal of the International Search Report and the Written Opinion of the International Searching Authority, or the Declaration"; cited in PCT/EP2013/066126; dated May 12, 2014; 10 pages.

Pinho, R.D.D. et al.; "An Incremental Space to Visualize Dynamic Data Sets"; Jan, 29, 2010; 30 pages.

\* cited by examiner

RENDERING HIERARCHICAL VISUALIZATIONS OF DATA SETS

BACKGROUND

Large volumes of data are available to users of computing devices. When a user electronically searches for data related to a particular subject, a list of search results may be presented to the user. To help the user understand the scope and/or content of the search results, a summary of the search results may also be presented to the user.

BRIEF DESCRIPTION OF THE DRAWINGS

The following detailed description references the drawings, wherein.

DETAILED DESCRIPTION

Textual or graphical summaries of a data set may help a user of a computing device better understand the scope and/or content of the data set, especially when the user does not have enough time or resources to examine all elements of the data set individually. For example, when a user types a query into a search engine, the user may be overwhelmed with the number of search results and may not be able to find the desired information without a summary of the results. The ability to visualize key concepts and ideas in a large data set may be advantageous in helping the user obtain desired information and draw accurate conclusions.

Treemaps and Voronoi diagrams, which represent different entities (e.g., documents) as tessellated polygons, may be used to visualize large data sets. The size of each polygon may represent a measure that has been assigned to the respective entity. Although treemaps and Voronoi diagrams may summarize a data set with respect to a particular measure of the entities, such diagrams may not indicate sentiments toward the entities or conceptual similarity between the entities.

The present disclosure addresses these issues by providing for rendering of visualizations that convey multiple aspects of a data set, such as concepts of the data set, sentiments toward the concepts, importance of the concepts relative to one another in the data set, and similarity between concepts. For example, a visualization in the present disclosure may be a tessellation of geometric shapes, each of which corresponds to a topic in the data set. Sizes of the geometric shapes may indicate the importance of the corresponding topics in the data set. The geometric shapes may be colored or shaded to indicate sentiments toward the respective topics, and shapes that correspond to closely related topics may be positioned in close spatial proximity in the tessellation. In addition, visualizations discussed in the present disclosure may present concepts in multiple levels of hierarchy, allowing a user to obtain information at the desired granularity.

Figure 1:
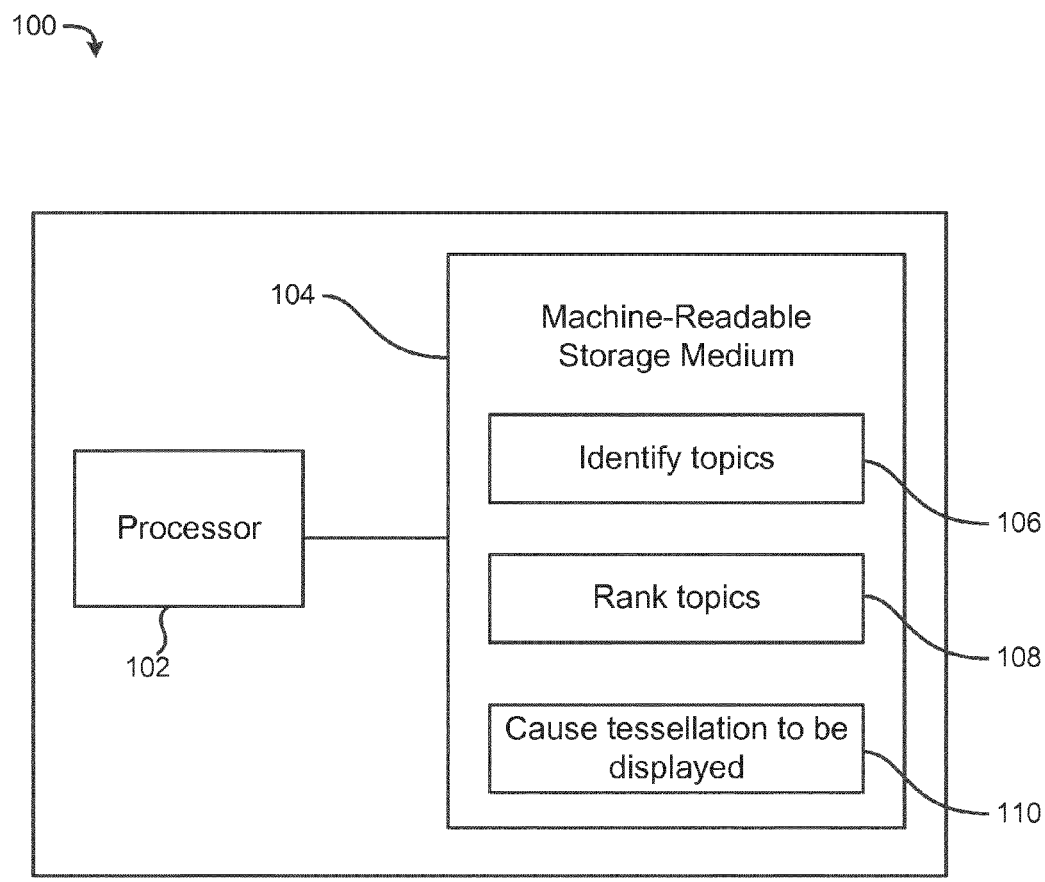
FIG. 1 is a block diagram of an example device that enables rendering of a hierarchical visualization of a data set.

Referring now to the drawings, FIG. 1 is a block diagram of an example device 100 that enables rendering of a hierarchical visualization of a data set. Device 100 may be a server, such as a cloud server, a remote server, or any electronic device accessible to a client device. Device 100 may be a client computing device, such as a notebook computer, a desktop computer, a workstation, a tablet computing device, a mobile phone, an electronic book reader, or any other electronic device suitable for displaying a visualization of a data set. In FIG. 1, device 100 includes processor 102 and machine-readable storage medium 104.

Processor 102 may include a central processing unit (CPU), microprocessor (e.g., semiconductor-based microprocessor), and/or other hardware device suitable for retrieval and/or execution of instructions stored in machine-readable storage medium 104. Processor 102 may fetch, decode, and/or execute instructions 106, 108, and 110 to enable rendering of a visualization of a data set, as described below. As an alternative or in addition to retrieving and/or executing instructions, processor 102 may include an electronic circuit comprising a number of electronic components for performing the functionality of instructions 106, 108, and/or 110.

Machine-readable storage medium 104 may be any suitable electronic, magnetic, optical, or other physical storage device that contains or stores executable instructions. Thus, machine-readable storage medium 104 may include, for example, Random Access Memory (RAM), an Electrically Erasable Programmable Read-Only Memory (EEPROM), a storage device, an optical disc, and the like. In some implementations, machine-readable storage medium 104 may include a non-transitory storage medium, where the term "non-transitory" does not encompass transitory propagating signals. As described in detail below, machine-readable storage medium 104 may be encoded with a set of executable instructions 106, 108, and 110 to identify topics, rank topics, and cause a tessellation to be displayed.

Identify topics instructions 106 may analyze a data set to identify various topics of documents in the data set. It should be understood that the term "documents" as used herein refers to any form of media that may be used to convey information. Documents may include textual information (e.g., articles, blog posts/comments, research papers, business/financial/medical records or reports), videos, photographs, audio information (e.g., voicemails, podcasts, music recordings), e-mail messages, social media activity, or any combination of the above and/or other suitable documents.

Identify topics instructions 106 may identify topics of documents using optical character recognition (OCR), automatic speech recognition, and/or any other suitable method for determining a subject of a document. In some implementations, topics may be identified by reading subject tags or keyword tags associated with the documents.

Identify topics instructions 106 may separate identified topics into various hierarchical levels. It should be understood that the term "hierarchical level" as used herein refers to a level of specificity in organization of a data set. Elements at the same hierarchical level may have approximately the same level of specificity. A first hierarchical level may be the top hierarchical level and have the broadest topics. A second hierarchical level may have topics, also referred to herein as sub-topics, that may be narrower than and grouped under the top-level topics. Throughout the present disclosure, the terms "level of hierarchy" and "hierarchical level" are used interchangeably. Identify topics instructions 106 may identify topics and sort them into different hierarchical levels based on a cluster map and/or hierarchical tree associated with a data set. For example, identify topics instructions 106 may identify a plurality of topics related to the top level of a hierarchical tree and determine that the plurality of topics belong in the top hierarchical level of topics. Identify topics instructions 106 may locate the top-level topics in a cluster map and identify sub-topics of respective top-level topics.

It should be understood that identify topics instructions 106 may perform a parametric analysis, rather than a topical analysis (i.e., identification of topics related to a data set), of a data set when the data set has some inherent structure or organization. For example, a data set that includes medical records of patients may be organized by parameters such as patient name, medical condition, and symptoms. Identify topics instructions 106 may sort parameters into various hierarchical levels in the same manner that topics may be sorted. It should be understood that discussions in the present disclosure regarding visualizations based on topical analysis of data sets are also applicable to visualizations based on parametric analysis, or any other suitable analyses, of data sets.

Rank topics instructions 108 may rank identified topics in order of importance. The importance of a topic may be based on how many documents in the data set are relevant to the topic. For example, the topic that is relevant to the most documents in the data set may be ranked as the most important topic. The topic that is relevant to the fewest documents in the data set may be ranked as the least important topic. It should be understood that other suitable bases for ranking topics may be used, such as number of times documents related to respective topics have been viewed, and popularity of topics on social media. Rank topics instructions 108 may rank topics in the top hierarchical level in order of importance. For each topic at the top hierarchical level, rank topics instructions 108 may rank the relevant sub-topics (e.g., topics at a second hierarchical level below the top hierarchical level), if any, in order of importance.

Cause tessellation to be displayed instructions 110 may cause a visualization of the data set to be displayed on a computing device. The visualization may include a tessellation of geometric shapes, each corresponding to an identified topic. The tessellation may have a plurality of hierarchical levels that correspond to the plurality of hierarchical levels of the identified topics. Each of a first plurality of geometric shapes in the tessellation may correspond to one of the topics in the top hierarchical level. As used herein, the terms "tessellation", "tessellate", and "tessellated" refer to a tiling of a plane with geometric shapes that fill the plane. In some implementations, a tessellation may have no overlaps of and no gaps between shapes. In some implementations, a tessellation may include some overlaps of and/or small gaps between shapes (e.g., a narrow, uniform space may separate the boundaries of each shape).

The sizes of the first plurality of geometric shapes may be based on rankings of the corresponding topics. For example, the size of one of the first plurality of geometric shapes may be directly proportional to the importance of its corresponding topic. That is, the largest geometric shape in the first plurality of geometric shapes may correspond to the most important topic (e.g., the topic that is relevant to the most documents in the data set) in the top hierarchical level. The smallest geometric shape in the first plurality of geometric shapes may correspond to the least important topic (e.g., the topic that is relevant to the least documents in the data set) in the top hierarchical level. Text labels associated with the geometric shapes may identify respective topics. For example, each of the first plurality of geometric shapes may have a text label that identifies the corresponding topic.

Sentiments associated with topics may be indicated in the visualization. As used herein, the term "sentiment" should be understood to mean an emotion or attitude expressed or elicited by a topic and/or its relevant documents. Each of the first plurality of geometric shapes may have a visual representation of a sentiment associated with the respective one of the first plurality of topics. Sentiments associated with the first plurality of topics may be determined based on sentiment tags associated with documents in the data set. The visual representation may include a color, a shading pattern, an icon, or any other suitable indicator of sentiment. For example, if documents relevant to a topic are associated with sentiment tags indicating anger, the geometric shape associated with the topic may be colored red. If documents relevant to a topic are associated with sentiment tags indicating approval, the geometric shape associated with the topic may be colored green.

The tessellation may have a second hierarchical level that has a second plurality of geometric shapes. The second plurality of geometric shapes may correspond to a second plurality of topics in a hierarchical level other than the top hierarchical level. The second plurality of topics may be related to one of the first plurality of topics (e.g., the second plurality of topics may be sub-topics of one of the top-level topics). Sizes of the second plurality of geometric shapes may be based on a ranking of the second plurality of topics by importance. The second plurality of geometric shapes may be associated with text labels and sentiments. For example, each of the second plurality of geometric shapes may have a text label that identifies the corresponding topic. Each of the second plurality of geometric shapes may have a visual representation of a sentiment associated with the respective one of the second plurality of topics.

The visual representation of sentiment for a shape in the second plurality of geometric shapes may be the same as or different from the visual representation for the shape in the first plurality of geometric shapes that corresponds to the related top-level topic. A selection of one of the first plurality of geometric shapes in the top hierarchical level of the tessellation may cause a second plurality of geometric shapes to be displayed on a computing device. The second plurality of geometric shapes may be at a second hierarchical level of the tessellation, and may correspond to sub-topics of the topic corresponding to the selected top-level shape. The second plurality of geometric shapes may tessellate within the selected one of the first plurality of geometric shapes. The selected top-level shape may be a particular color, indicating a general sentiment toward the corresponding top-level topic. The second plurality of geometric shapes displayed after selection of the top-level shape may be the same color or have different colors, since sentiments toward certain sub-topics of a top-level topic may be different from the sentiment toward the top-level topic.

In some implementations, a first plurality of geometric shapes at the top hierarchical level of a tessellation may be displayed on a computing device in a semi-transparent manner, such that borders and/or text labels of a second plurality of geometric shapes at a second hierarchical level of the tessellation are visible underneath the first plurality of geometric shapes. The colors (or other visual representations of sentiment) of the second plurality of shapes may not be visible until a top-level shape is selected, when the shapes at the second hierarchical level that are within the selected top-level shape may be more clearly displayed (e.g., borders and text labels of the second-level shapes may become darker) on a computing device. In some implementations, geometric shapes at a second hierarchical level of the tessellation may not be visible until a top-level shape is selected.

As discussed above, device 100 may be a server or a client computing device. If device 100 is a server, cause tessellation to be displayed instructions 110 may transmit instructions for rendering the tessellation to a client computing device. If device 100 is a client computing device, device 100 may receive instructions for rendering the tessellation from a server, and execute the instructions to render the tessellation for display. Instructions to generate a tessellation as a visualization of a data set are discussed further with respect to FIG. 2.

Figure 2:
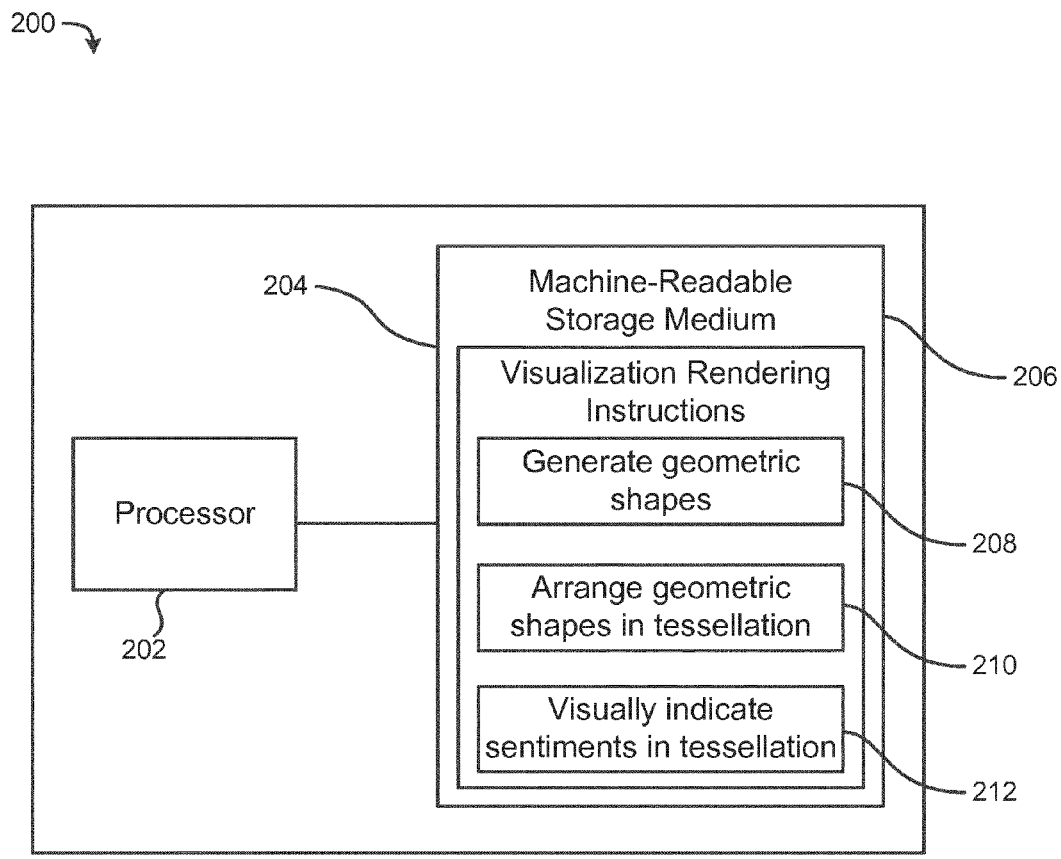
FIG. 2 is a block diagram of an example device that includes a machine-readable storage medium encoded with instructions to generate and arrange geometric shapes for a visualization of a data set.

FIG. 2 is a block diagram of an example device 200 that includes a machine-readable storage medium encoded with instructions to generate and arrange geometric shapes for a visualization of a data set. Device 200 may be a server, such as a cloud server, a remote server, or any electronic device accessible to a client device. Device 200 may be a client computing device, such as a notebook computer, a desktop computer, a workstation, a tablet computing device, a mobile phone, an electronic book reader, or any other electronic device suitable for displaying a visualization of a data set. In FIG. 2, device 200 includes processor 202 and machine-readable storage medium 204.

As with processor 102 of FIG. 1, processor 202 may include a central processing unit (CPU), microprocessor (e.g., semiconductor-based microprocessor), and/or other hardware device suitable for retrieval and/or execution of instructions, such instructions stored in machine-readable storage medium 204. Processor 202 may fetch, decode, and/or execute visualization rendering instructions 206 to enable rendering of a visualization of a data set, as described below. Visualization rendering instructions 206 may include instructions 208, 210, and 212. It should be understood that visualization rendering instructions 206 may include instructions in addition to and/or instead of instructions 208, 210, and 212. In some implementations, visualization rendering instructions 206 may be included in cause tessellation to be displayed instructions 110 of FIG. 1.

As an alternative or in addition to retrieving and/or executing instructions, processor 202 may include an electronic circuit comprising a number of electronic components for performing the functionality of visualization rendering instructions 206. As with machine-readable storage medium 104 of FIG. 1, machine-readable storage medium 204 may be any suitable physical storage device that stores executable instructions, such as visualization rendering instructions 206.

Generate geometric shapes instructions 208 may generate a first plurality of geometric shapes corresponding to a first plurality of topics at a first hierarchical level of a data set, and generate a second plurality of geometric shapes corresponding to a second plurality of topics at a second hierarchical level of the data set. The first plurality of topics may be topics at the top hierarchical level of the data set, as discussed above with respect to FIG. 1. The second plurality of topics may be sub-topics of the top-level topics, and may be in a hierarchical level other than the top hierarchical level. It should be understood that the second plurality of topics at the second hierarchical level may be further broken down into topics at a third hierarchical level and beyond, and that generate geometric shapes instructions 208 may generate additional geometric shapes corresponding to topics at the additional hierarchical level(s).

The geometric shapes may vary in size based on importance of the respective corresponding topics. For example, the largest geometric shape in the first plurality of geometric shapes may correspond to the most important topic in the first plurality of topics, the second-largest geometric shape in the first plurality of geometric shapes may correspond to the second most important topic in the first plurality of topics, and so on. The importance of each topic may be based on how many documents in the data set are relevant to the topic.

The second plurality of topics may be sub-topics that are all related to the same top-level topic, or may be sub-topics related to different top-level topics. For each top-level topic, the related sub-topics at the second hierarchical level of the data set may be ranked in order of importance, and the geometric shapes in the second plurality of geometric shapes that correspond to the sub-topics may be sized accordingly. For example, a first group of geometric shapes in the second plurality of geometric shapes may correspond to sub-topics of a first top-level topic, and a second group of geometric shapes in the second plurality of geometric shapes may correspond to sub-topics of a second top-level topic. The largest geometric shape in the first group of geometric shapes may correspond to the most important sub-topic of the first top-level topic, the second-largest geometric shape in the first group of geometric shapes may correspond to the second most important sub-topic of the first top-level topic, and so on. Independent of the sizes of the geometric shapes in the first group of geometric shapes, the geometric shapes in the second group of geometric shapes may be sized such that the largest corresponds to the most important sub-topic of the second top-level topic, the second-largest corresponds to the second most important sub-topic of the second top-level topic, and so on. Other geometric shapes corresponding to sub-topics of other top-level topics may be sized in the same manner.

Arrange geometric shapes in tessellation instructions 210 may arrange the geometric shapes into a hierarchical tessellation (i.e., a tessellation having multiple levels of hierarchy). The first plurality of geometric shapes may be tessellated in a plane that corresponds to the top level of hierarchy of the tessellation. The second plurality of geometric shapes may be in a second level of hierarchy of the tessellation, and may be arranged such that all geometric shapes corresponding to sub-topics that are in the second hierarchical level of the data set, and that are related to the same top-level topic, are tessellated inside the geometric shape corresponding to the top-level topic.

The first plurality of geometric shapes may be arranged by placing the largest geometric shape (e.g. the geometric shape corresponding to the most important top-level topic) in the top-level plane first, then placing the second-largest geometric shape adjacent to the largest geometric shape, and so on until all of the first plurality of geometric shapes have been placed in the top-level plane. For example, the largest geometric shape may be placed in the bottom-right corner of the top-level plane, the second- and third-largest geometric shapes may border the largest geometric shape (e.g., above and to the left of the largest geometric shape), and the rest of the geometric shapes in the first plurality of geometric shapes may be added in decreasing order of size, being placed at an increasing distance from the bottom-right corner of the plane such that the smallest geometric shapes are farthest away from the largest geometric shape. Geometric shapes corresponding to sub-topics of a top-level topic may be arranged inside the geometric shape corresponding to the top-level topic in a similar manner (e.g., such that the largest second-level shape is in the bottom right corner of the top-level shape and the smallest second-level shapes are in the top left corner of the top-level shape). It should be understood that the position of the largest geometric shape is not limited to the bottom-right corner of the plane or top-level geometric shape; any suitable position in the plane or top-level geometric shape may be used.

The geometric shapes corresponding to topics in the data set may initially be rectangles in a treemap. A treemap may be a plane tiled with rectangles whose areas may be proportional to a specified aspect (e.g., importance, quantity) of respective entities (e.g., topics) corresponding to the rectangles. For example, arrange geometric shapes in tessellation instructions 210 may generate a treemap of the first plurality of topics. Each rectangle of this top-level treemap may correspond to one of the first plurality of topics, and may itself be a treemap of sub-topics that are in the second plurality of topics and that are relevant to the top-level topic.

Arrange geometric shapes in tessellation instructions 210 may identify vertexes in the treemap, and then split the treemap into a tessellation of irregular geometric shapes by running a physics simulation on the vertexes of the treemap. A point in the treemap where two lines cross may be split into two separate vertexes. During a time step of the simulation, various forces may be applied to the vertexes in the treemap. Such forces may include a contractionary force that pulls adjacent vertexes on each geometric shape toward each other, an expansion force pushing all vertexes away from a centroid of their respective geometric shapes, and a contraction force pulling all vertexes toward a centroid of their respective geometric shapes. The forces applied to the vertexes may be proportional to the area of their respective shapes, and may be used to expand or contract shapes depending on whether the shapes are bigger or smaller than they should be (e.g., with respect to other shapes, based on a ranking of importance of the topics corresponding to the shapes).

Various guidelines may restrict movement of the vertexes while the forces are applied. Vertexes on a first line that terminates at a second line may only be allowed to move along the second line. Vertexes on an outer edge of the rectangle that bounds the treemap may only be allowed to move along the edge, and the vertexes in corners of the rectangle may not be allowed to move. Vertexes of the second plurality of geometric shapes may be constrained by boundaries of the first plurality of geometric shapes. For example, a group of geometric shapes corresponding to sub-topics of a top-level topic may be tessellated inside the geometric shape corresponding to the top-level topic. Geometric shapes in such a group may have vertexes that are on the boundaries of the top-level geometric shape, and such vertexes may move with the boundaries of the top-level geometric shape.

To make the positions of the vertexes settle faster, arrange geometric shapes in tessellation instructions 210 may apply an exponentially decaying multiplier to the forces. A simulation may end when a certain number of time steps have occurred, or when the vertexes have stopped moving, or when the amount of movement of the vertexes is below a certain threshold level. Any other suitable criteria may be used to determine when to end a simulation.

In some implementations, the physics simulation discussed above may be run for vertexes of the first plurality of geometric shapes (e.g., geometric shapes in the top hierarchical level of the tessellation), then for vertexes of the second plurality of geometric shapes (e.g., geometric shapes in the second hierarchical level of the tessellation). It should be understood that a physics simulation may be run for vertexes of additional hierarchical levels after the simulation (s) for higher hierarchical levels are complete. In some implementations, a physics simulation may be run for all vertexes at all hierarchical levels of the tessellation at the same time. In some implementations, the physics simulation may be run for vertexes of a certain subset of the hierarchical levels, then for vertexes of other subsets of the hierarchical levels.

At the end of a simulation, arrange geometric shapes in tessellation instructions 210 may compute areas of and render text labels for the geometric shapes. Text labels for the first plurality of geometric shapes and the second plurality of geometric shapes may be rendered after all shapes have been arranged in the hierarchical tessellation, or text labels for a certain plurality of shapes may be rendered at the end of the simulation that is run on the vertexes of the respective hierarchical level. The text labels may indicate the topics corresponding to the geometric shapes, and each text label may be sized to fit within its respective geometric shape. Each text label may be rendered approximately in the centroid of its respective geometric shape.

Visually indicate sentiments in tessellation instructions 212 may visually indicate, in the tessellation, sentiments associated with the first plurality of topics. Visually indicate sentiments in tessellation instructions 212 may visually indicate sentiments by assigning a color or shading pattern to, or placing an icon on, each of the first plurality of shapes. The sentiments associated with the first plurality of topics may be determined based on sentiment tags associated with documents in the data set.

In some implementations, visualization rendering instructions 206 may include instructions to display a first plurality of geometric shapes in a semi-transparent manner such that a second plurality of geometric shapes are visible under the first plurality of geometric shapes. For example, borders and/or text labels of a second plurality of geometric shapes at a second hierarchical level of a tessellation may be visible while a first plurality of geometric shapes is displayed on a computing device. Second-level shapes may initially appear to have the same color or shading pattern as top-level shapes through which the second-level shapes are viewed. A selection of a top-level shape may cause the second-level shapes underneath it to be more clearly displayed (e.g., borders and text labels of the second-level shapes may become darker), and colors or shading patterns of the second-level shapes that are different from that of the top-level shape may become visible. In some implementations, geometric shapes at a second hierarchical level of a tessellation may not be visible until a top-level shape is selected.

As discussed above, device 200 may be a server or a client computing device. If device 200 is a server, device 200 may transmit visualization rendering instructions 206 to a client computing device. If device 200 is a client computing device, device 200 may receive visualization rendering instructions 206 from a server, and execute the instructions to render the visualization for display.

Figure 3:
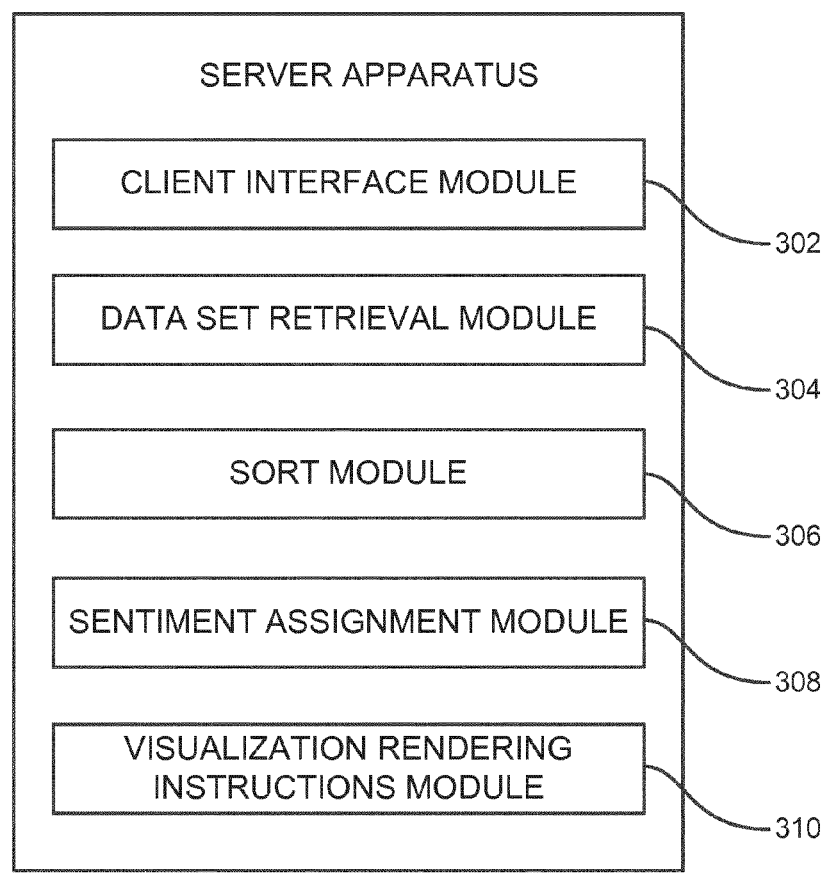
FIG. 3 is a block diagram of an example server apparatus that enables rendering, on a client computing device, of a visualization of a data set.

FIG. 3 is a block diagram of an example server apparatus 300 that enables rendering, on a client computing device, of a visualization of a data set. Server apparatus 300 may be a cloud server, a remote server, or any electronic device accessible to a client device. Server apparatus 300 may be implemented, for example, as device 100, device 200, or another suitable device or combination of devices. As illustrated in FIG. 3 and described in detail below, server apparatus 300 may include modules 302, 304, 306, 308, and 310. A module may include a set of instructions encoded on a machine-readable storage medium and executable by a processor of server apparatus 300. In addition or as an alternative, a module may include a hardware device comprising electronic circuitry for implementing the functionality described below.

Client interface module 302 may control interactions between server apparatus 300 and client computing devices. Client interface module 302 may receive queries from client computing devices and send requests to other modules of server apparatus 300 in response to queries from client computing devices. Client interface module 302 may transmit information, such as topics of a data set or instructions for rendering a visualization of a data set, to client computing devices.

Data set retrieval module 304 may identify and retrieve a data set that is related to a query from a client computing device. The data set may include documents related to a subject of the query. For example, a query received by server apparatus 300 may include a request for information related to a television show. The retrieved data set may include episode summaries of the show, critics' reviews of the show, video clips of the show, and biographical information of actors on the show. Data set retrieval module 304 may retrieve documents from a memory on server apparatus 300 and/or from another server. Data set retrieval module 304 may also retrieve subject tags, keyword tags, and/or sentiment tags associated with documents in the data set. Sentiment tags may be associated with documents based on sentiment analysis of the documents.

Sort module 306 may sort the data set into a plurality of topics. Sort module 306 may read subject and/or keyword tags associated with documents in the data set to identify topics that are relevant to the documents, then group together documents that are relevant to the same topic. Sort module 306 may generate or read a cluster map of the documents in the data set, identify topics based on the cluster map, and determine which documents are relevant to each topic.

Sort module 306 may also sort the plurality of topics into a plurality of levels of hierarchy. Sort module 306 may identify a set of broad topics, as well as narrower topics (e.g., sub-topics) relevant to respective broad topics. Using the example of the television show query, a broad topic may be "actors", and narrower topics may be the names of actors on the show. Sort module 306 may assign the broad topics (e.g., the topic "actors") to a first level of hierarchy (e.g., the top level of hierarchy), and may assign the narrower topics (e.g., names of actors) to a second level of hierarchy. In some implementations, sort module 306 may assign topics to respective levels of hierarchy based on a hierarchical tree associated with the data set.

Sentiment assignment module 308 may assign sentiments to the plurality of topics. The sentiments may be assigned based on sentiment tags associated with documents in the data set. Sentiment assignment module 308 may read all sentiment tags associated with documents related to a broad topic (e.g., a topic at the top level of hierarchy) and identify a sentiment that is indicated by a majority of such sentiment tags. The identified sentiment may be assigned to the broad topic. Sentiment assignment module 308 may also read all sentiment tags associated with documents related to each sub-topic (e.g., topics at a second level of hierarchy) of the broad topic and assign sentiments to the sub-topics accordingly. The sentiments assigned to some of the sub-topics may be different than the sentiment assigned to the broad topic. Using the example of the television show query, the sentiment assigned to the broad topic of "actors" may be "entertaining", based on sentiment tags of documents indicating that viewers of the show think the actors are talented and funny. However, the sentiment assigned to a particular one of the actors (i.e., a sub-topic of the broad topic "actors") may be "sad" because many of the documents relevant to the particular actor may be about the death the actor's spouse, and thus may be tagged with sentiment tags that indicate sadness.

Visualization rendering instructions module 310 may include instructions for rendering a visualization of a data set. The visualization may include a tessellation that includes a plurality of geometric shapes corresponding to a plurality of topics identified by sort module 306. Sizes of the plurality of geometric shapes may be proportional to the importance of the corresponding plurality of topics. The tessellation may be indicative of the sentiments assigned by sentiment assignment module 308 and of a plurality of levels of hierarchy. For example, a geometric shape in the tessellation may be colored to indicate the sentiment assigned to the topic that corresponds to the shape. The tessellation may have a first plurality of geometric shapes at a top level of hierarchy. A second plurality of geometric shapes at a second level of hierarchy may be visible through the first plurality of geometric shapes. Client interface module 302 may transmit instructions of visualization rendering instructions module 310 to a client computing device, which may execute the instructions and display the visualization.

Figure 4:
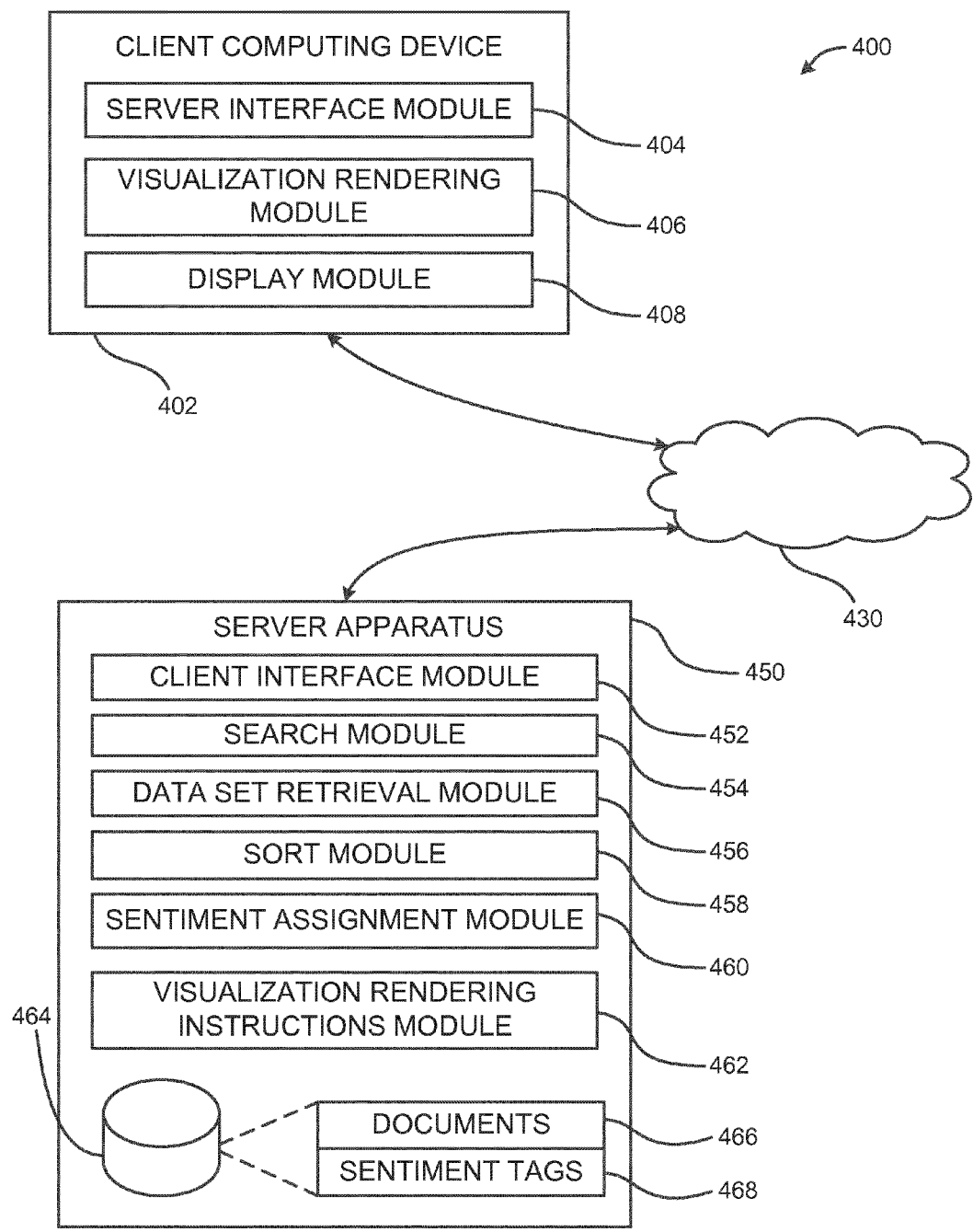
FIG. 4 is a block diagram of an example server apparatus in communication with a client computing device to enable rendering of a hierarchical visualization of a data set.

FIG. 4 is a block diagram of a system 400 having an example server apparatus 450 in communication via a network 430 with a client computing device 402 to enable rendering of a hierarchical visualization of data set. As illustrated in FIG. 4 and described below, server apparatus 450 may communicate with client computing device 402 to provide topics related to a data set and instructions for rendering a visualization of the data set.

Client computing device 402 may include modules 404, 406, and 408, while server apparatus 450 may include modules 452, 454, 456, 458, 460, and 462. A module may include a set of instructions encoded on a machine-readable storage medium and executable by a processor of the respective devices 402 and 450. In addition or as an alternative, a module may include a hardware device including electronic circuitry for implementing the functionality described below. Client computing device 402 may be implemented, for example, as device 100, device 200, or another suitable device or combination of devices.

Server apparatus 450 may be any server that is accessible to client computing device 402 over network 430 and that is suitable for executing the functionality described below. Server apparatus 450 may be implemented, for example, as device 100, device 200, server apparatus 300, or another suitable device or combination of devices. Modules 452, 456, 458, 460, and 462 of server apparatus 450 may be analogous to (e.g., have functions and/or components similar to) modules 302, 304, 306, 308, and 310, respectively, of server apparatus 300.

Sort module 458 may identify topics (e.g., broad topics) at a first level of hierarchy. Search module 454 of server apparatus 300 may search for documents related to a topic that is at the first level of hierarchy. Search module 454 may search for documents within server apparatus 450, such as within database 464 of server apparatus 450, and/or on other servers. Database 464 may include documents 466, and may also include sentiment tags 468 associated with documents 466. Data set retrieval module 456 may retrieve the documents found by search module 454, and may also retrieve tags (e.g., subject tags, keyword tags, sentiment tags) associated with the documents. In some implementations, search module 454 may be part of data set retrieval module 456.

Sort module 458 may group documents found by search module 454 into sub-topics of the first-level topic and assign the sub-topics to a second level of hierarchy. The documents may be grouped into sub-topics based on subject tags and/or keyword tags associated with the documents, and/or based on a cluster map associated with the documents. Client interface module 452 may transmit the first-level topic and the sub-topics over network 430 to client computing device 402.

Client computing device 402 may be a notebook computer, a desktop computer, a workstation, a tablet computing device, a mobile phone, an electronic book reader, or any other electronic device suitable for executing the functionality described below. Server interface module 404 of client computing device 402 may transmit queries to and receive information from server apparatus 450 over network 430. Information received from server apparatus 450 may include topics of a data set that are assigned to a first level of hierarchy, sub-topics of the data set that are assigned to a second level of hierarchy, and instructions for rendering a visualization of the data set.

Visualization rendering module 406 of client computing device 402 may store and execute instructions for rendering the visualization. The instructions may be in a markup language (e.g., HTML5) supplemented by a scripting language (e.g. JavaScript). Visualization rendering module 406 may access a graphics library to generate the visualization. Visualization rendering module 406 may generate text labels for the visualization based on topics and sub-topics received from server apparatus 450.

Display module 408 may display the visualization on client computing device 402. The visualization may include a tessellation that includes a plurality of geometric shapes corresponding to the plurality of topics identified by sort module 458. Sizes of the plurality of geometric shapes may be proportional to the importance of the corresponding plurality of topics. The tessellation may be indicative of the sentiments assigned by sentiment assignment module 460 and of a plurality of levels of hierarchy. The tessellation may have a first plurality of geometric shapes that correspond to broad topics at a first level of hierarchy, and may also have a second plurality of geometric shapes that correspond to sub-topics at a second level of hierarchy. Geometric shapes corresponding to sub-topics of the same broad topic may be tessellated within a geometric shape corresponding to the broad topic.

Figure 5:
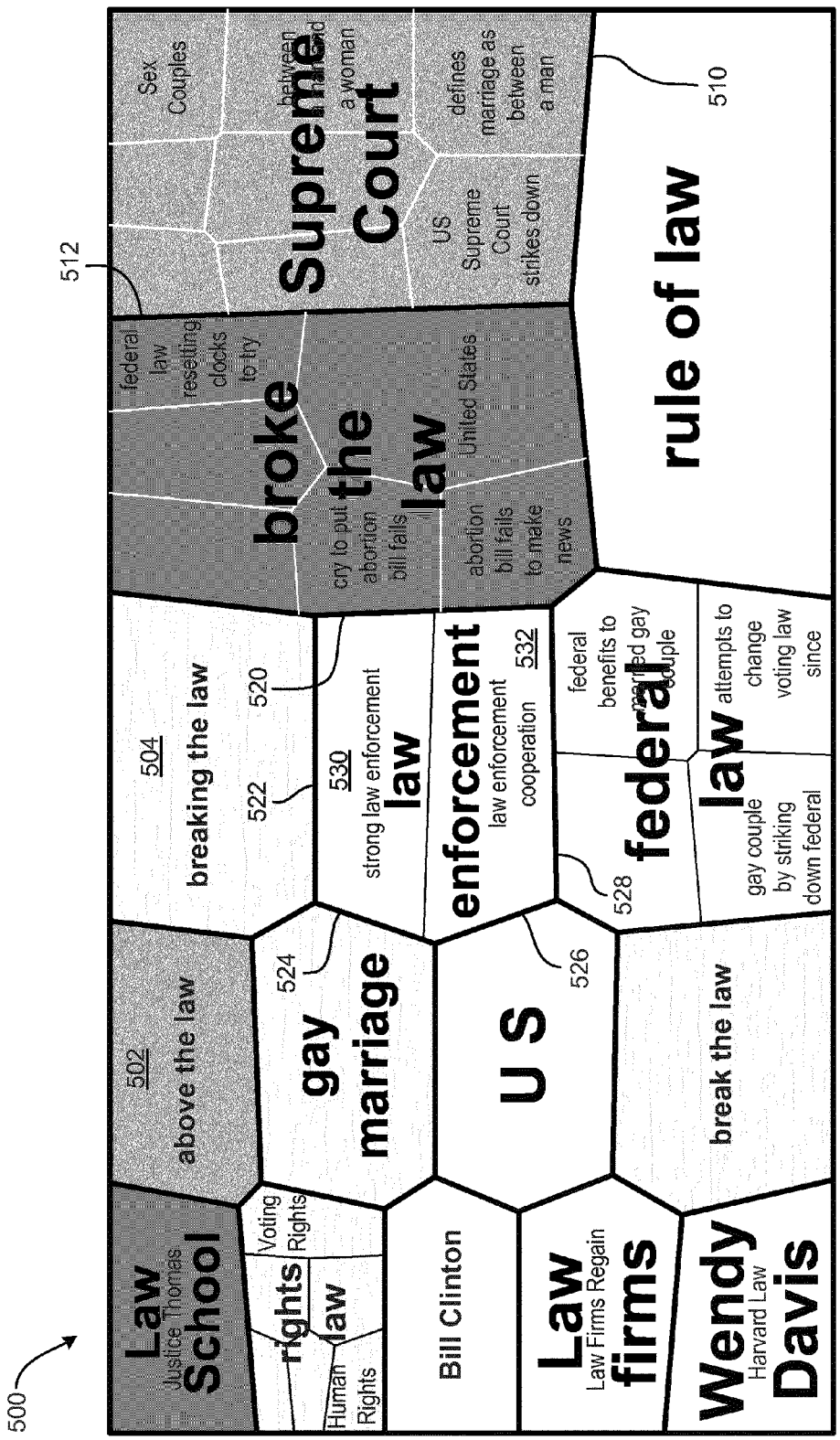
FIG. 5 is a diagram of an example hierarchical visualization of a data set.

FIG. 5 is a diagram of an example hierarchical visualization 500 of a data set. Visualization 500 may be generated based on a data set retrieved in response to a query for information regarding law or a legal system. For example, visualization 500 may be generated in response to a user typing the term "law" into a search engine. Visualization 500 may be generated by device 100, device 200, or client computing device 402.

Visualization 500 may include a tessellation of geometric shapes corresponding to different topics. The tessellation may have multiple levels of hierarchy. A first plurality of geometric shapes, including polygon 502 and polygon 504, may be at a first level of hierarchy (e.g., the top level of hierarchy) of the tessellation. The first plurality of geometric shapes may correspond to broad topics (e.g., topics at the top hierarchical level of the data set) related to law. Text labels in the first plurality of geometric shapes may identify the corresponding topics. For example, polygon 502 may correspond to the topic "above the law", and polygon 504 may correspond to the topic "breaking the law".

A second plurality of geometric shapes, including polygon 530 and polygon 532, may be at a second level of hierarchy of the tessellation. The second plurality of geometric shapes may correspond to topics at a second hierarchical level of a data set related to law. The topics corresponding to the second plurality of geometric shapes may be sub-topics of top-level broad topics. Text labels in the second plurality of geometric shapes may identify the corresponding topics. For example, polygon 530 may correspond to the topic "strong law enforcement", and polygon 532 may correspond to the topic "law enforcement cooperation". The topics corresponding to polygon 530 and polygon 532 may be sub-topics of the broad topic "law enforcement", which is the topic corresponding to the polygon defined by lines 520, 522, 524, 526, and 528. The sub-topics of a top-level topic may be obtained by performing a search for the top-level topic (e.g. "strong law enforcement" and "law enforcement cooperation" may be search results that are returned when the term "law enforcement" is typed into a search engine).

The sizes of geometric shapes in visualization 500 may be based on the importance of the corresponding topics. Shapes corresponding to more important topics may be bigger than shapes corresponding to less important topics. Topics may be ranked in order of importance based on how many documents in the data set are relevant to each topic; the most important topic may be the one that is relevant to the most documents. In FIG. 5, the top-level topic "Supreme Court" corresponds to a polygon that is in the first level of hierarchy of the tessellation and that is defined by line 510, line 512, and the top and right edges of the tessellation. The polygon corresponding to the top-level topic "Supreme Court" is larger than the polygon corresponding to the top-level topic "law enforcement", indicating that "Supreme Court" is a more important topic than "law enforcement" (e.g., more documents in the data set correspond to "Supreme Court" than "law enforcement").

In visualization 500, geometric shapes at the second level of hierarchy of the tessellation that correspond to sub-topics of the same top-level topic may tessellate within the geometric shape corresponding to the top-level topic. For example, second-level polygons 530 and 532, which correspond to sub-topics of the top-level topic "law enforcement", may tessellate within the top-level polygon corresponding to "law enforcement", which is defined by lines 520, 522, 524, 526, and 528. Sub-topics of the same top-level topic may also be ranked in order of importance, and the corresponding geometric shapes may be sized accordingly. For example, polygon 532 is larger than polygon 530, indicating that the sub-topic "law enforcement cooperation" is more important than "strong law enforcement" in the data set.

A geometric shape in visualization 500 may have a color that is indicative of a sentiment associated with the respective topic. For example, shapes corresponding to topics associated with positive/happy sentiments may be colored green. Shapes corresponding to topics associated with negative sentiments may be colored red. The different shades of gray in FIG. 5 may represent different colors of the top-level geometric shapes. Top-level geometric shapes in visualization 500 may be semi-transparent, such that borders and/or text of second-level geometric shapes (e.g., polygons 530 and 532) are visible through the top-level geometric shapes. It should be understood that other visual representations of sentiment may be used instead of colors in visualization 500.

The second-level geometric shapes in a visualization may appear to be the same color as the top-level shapes when viewed through the top-level shapes, but a selection of a top-level shape may cause the true colors of the second-level shapes underneath (e.g., seen within the top-level shape) to be displayed. In addition, not all text labels of second-level shapes may be visible when the second-level shapes are viewed through top-level shapes, but text labels of all second-level shapes underneath a top-level shape may be displayed after the top-level shape is selected. In some implementations, the colors (or other visual representations of sentiment), borders, and text labels of second-level shapes under a top-level shape may be displayed when a user moves a cursor or pointer over the top-level shape.

Figure 6:
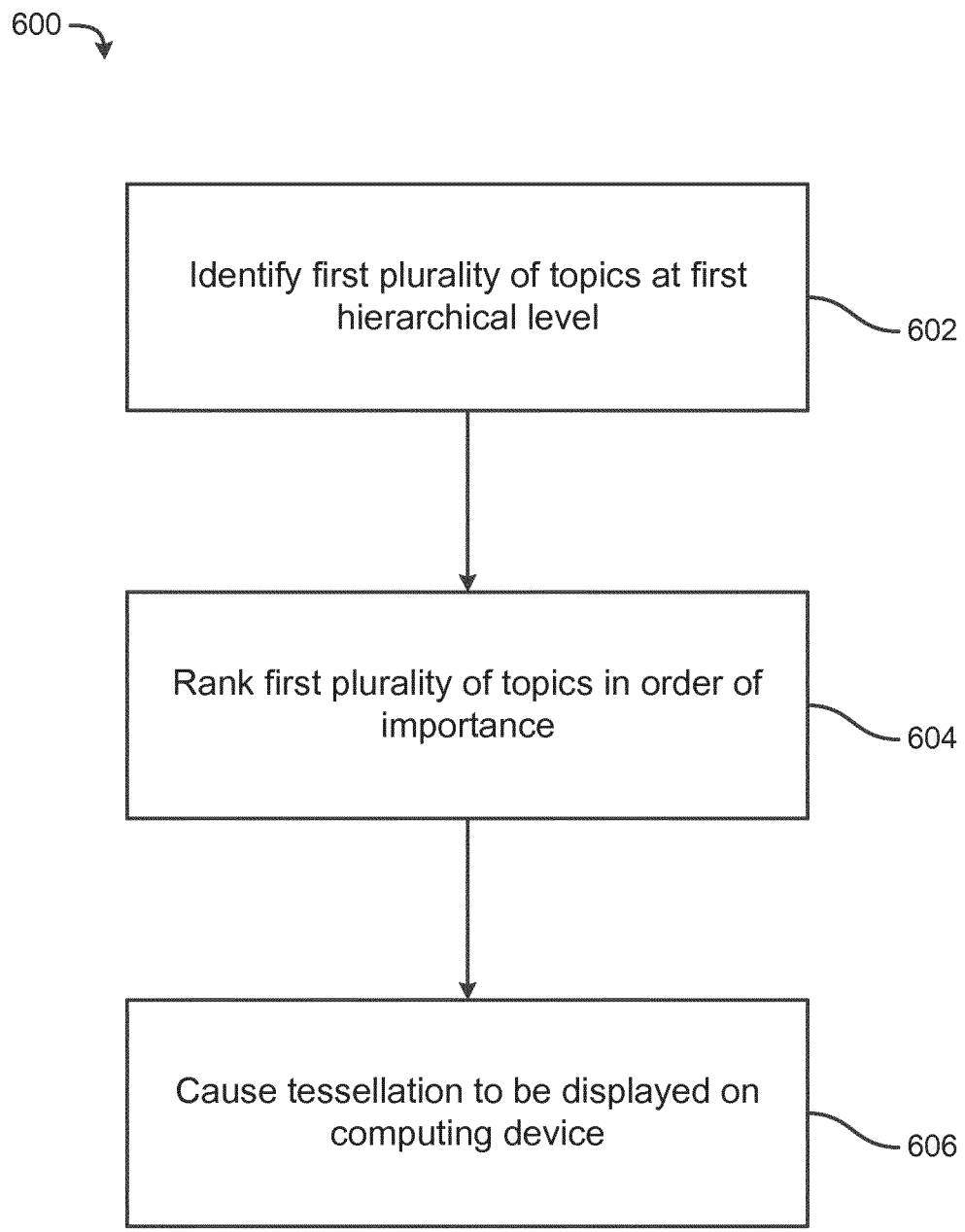
FIG. 6 is a flowchart of an example method for rendering, on a computing device, a visualization of a data set.

Methods related to rendering a visualization, such as visualization 500 of FIG. 5, of a data set are discussed with respect to FIGS. 6-10. FIG. 6 is a flowchart of an example method 600 for rendering, on a computing device, a visualization of a data set. Although execution of method 600 is described below with reference to device 100 of FIG. 1, it should be understood that execution of method 600 may be performed by other suitable devices, such as a server apparatus (e.g., server apparatus 300 or 450) or a client computing device (e.g., client computing device 402). Method 600 may be implemented in the form of executable instructions stored on a machine-readable storage medium, such as storage medium 104, and/or in the form of electronic circuitry.

Method 600 may start in block 602, where device 100 may identify a first plurality of topics at a first hierarchical level. For example, device 100 may identify broad topics of documents in a data set. The topics may be identified based on a cluster map and/or hierarchical tree of the data set.

Next, in block 604, device 100 may rank the first plurality of topics in order of importance. The importance of a topic may be based on how many documents in the data set are relevant to the topic. For example, the topic that is relevant to the most documents in the data set may be ranked as the most important topic. The topic that is relevant to the fewest documents in the data set may be ranked as the least important topic.

Finally, in block 606, device 100 may cause a tessellation to be displayed on a computing device. The tessellation may be made up of geometric shapes corresponding to the first plurality of topics. If device 100 is a server, device 100 may transmit instructions for rendering the tessellation to a client computing device, which may execute the instructions and display the tessellation. If device 100 is a client computing device, device 100 may execute instructions for rendering the tessellation and display the tessellation.

Figure 7:
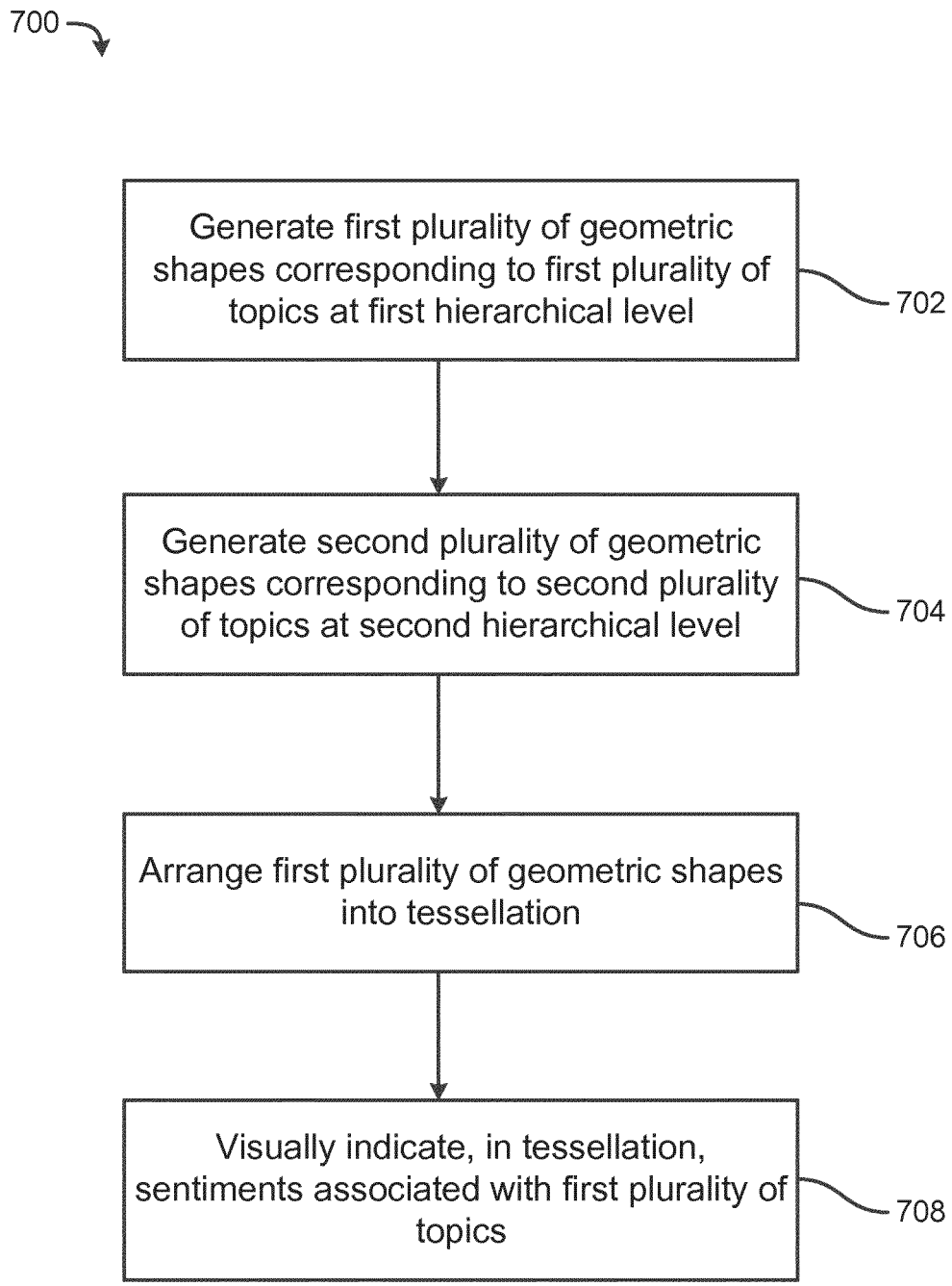
FIG. 7 is a flowchart of an example method for rendering a visualization of a data set by generating and arranging geometric shapes in a tessellation.

FIG. 7 is a flowchart of an example method 700 for rendering a visualization of a data set by generating and arranging geometric shapes in a tessellation. Although execution of method 700 is described below with reference to device 200 of FIG. 2, it should be understood that execution of method 700 may be performed by other suitable devices, such as client computing device 402 of FIG. 4. Method 700 may be implemented in the form of executable instructions stored on a machine-readable storage medium, such as storage medium 204, and/or in the form of electronic circuitry.

Method 700 may start in block 702, where device 200 may generate a first plurality of geometric shapes corresponding to a first plurality of topics at a first hierarchical level. The first plurality of topics may be broad topics of documents in a data set. The first hierarchical level may be the top hierarchical level of topics.

In block 704, device 200 may generate a second plurality of geometric shapes corresponding to a second plurality of topics at a second hierarchical level. The second plurality of topics may be sub-topics of the first plurality of topics. The second hierarchical level may be a level below the top hierarchical level of topics.

Next, in block 706, device 200 may arrange the first plurality of geometric shapes into a tessellation. The first plurality of geometric shapes may be tessellated in a plane that corresponds to the top level of hierarchy of the tessellation. The first plurality of geometric shapes may be arranged by placing the largest geometric shape (e.g. the geometric shape corresponding to the most important top-level topic) in the top-level plane first, then placing the second-largest geometric shape adjacent to the largest geometric shape, and so on until all of the first plurality of geometric shapes have been placed in the top-level plane.

Finally, in block 708, device 200 may visually indicate, in the tessellation, sentiments associated with the first plurality of topics. Sentiments may be visually indicated by shading the first plurality of geometric shapes with different colors or patterns, or by placing icons on the first plurality of geometric shapes.

Figure 8:
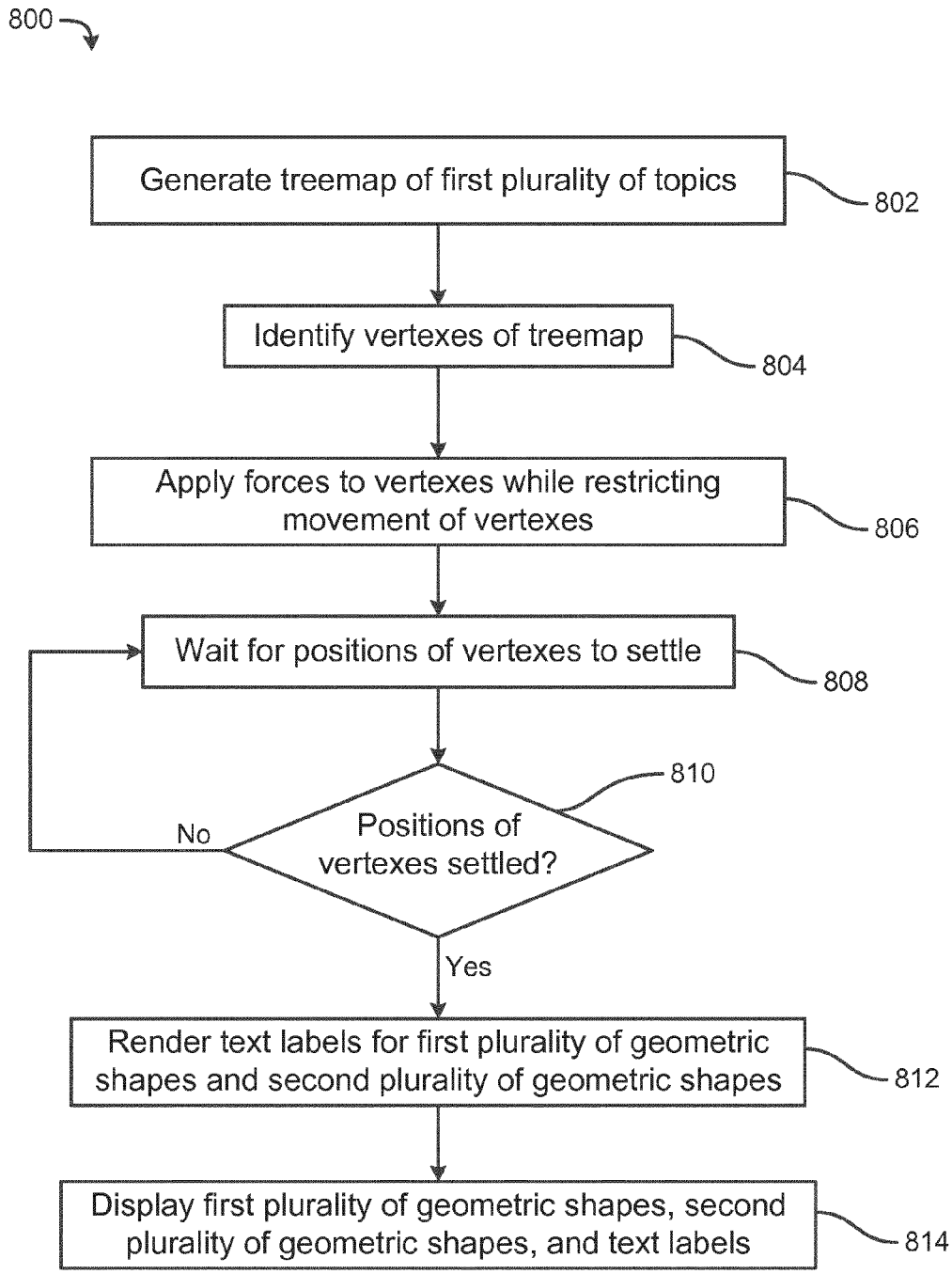
FIG. 8 is a flowchart of an example method for rendering a visualization of a data set by modifying a treemap derived from the data set.

FIG. 8 is a flowchart of an example method 800 for rendering a visualization of a data set by modifying a treemap derived from the data set. Although execution of method 800 is described below with reference to device 200 of FIG. 2, it should be understood that execution of method 800 may be performed by other suitable devices, such as client computing device 402 of FIG. 4. Method 800 may be implemented in the form of executable instructions stored on a machine-readable storage medium, such as storage medium 204, and/or in the form of electronic circuitry.

Method 800 may start in block 802, where device 200 may generate a treemap of a first plurality of topics. Each rectangle of the treemap may correspond to one of the first plurality of topics. A rectangle corresponding to one of the first plurality of topics may itself be a treemap of narrower topics (e.g., sub-topics) of the respective topic.

In block 804, device 200 may identify vertexes of the treemap. A point in the treemap where two lines cross may be split into two separate vertexes. Next, in block 806, device 200 may run a simulation in which forces are applied to the vertexes while movement of the vertexes is restricted. A force that is applied may be a contractionary force or an expansion force, as discussed above with respect to FIG. 2. The forces applied to the vertexes may be proportional to the area of their respective shapes, and may be used to expand or contract shapes depending on whether the shapes are bigger or smaller than they should be (e.g., with respect to other shapes, based on a ranking of importance of the topics corresponding to the shapes). To make the positions of the vertexes settle faster, device 200 may apply an exponentially decaying multiplier to the forces. Various guidelines may restrict movement of the vertexes while the forces are applied; examples of such guidelines are discussed above with respect to FIG. 2. The application of forces to vertexes in block 806 may change the treemap of block 802 into a tessellation of geometric shapes (e.g., irregular polygons). The tessellation may have a first plurality of geometric shapes corresponding to the first plurality of topics, and a second plurality of geometric shapes corresponding to the sub-topics.

In block 808, device 200 may wait for positions of the vertexes to settle. In block 810, device 200 may determine whether positions of the vertexes have settled. Device 200 may determine that the positions of the vertexes have settled when the vertexes have stopped moving, or when the amount of movement of the vertexes is below a certain threshold level.

In some implementations, device 200 may perform the elements of blocks 806, 808, and 810 for vertexes of the first plurality of geometric shapes, then for the second plurality of geometric shapes. In some implementations, device 200 may perform the elements of blocks 806, 808, and 810 for vertexes of the first plurality of geometric shapes and the second plurality of geometric shapes at the same time.

When device 200 determines that the positions of the vertexes have not settled, method 800 may loop back to block 808. When device 200 determines that the positions of the vertexes have settled, method 800 may proceed to block 812, in which device 200 may render text labels for the first plurality of geometric shapes and a second plurality of geometric shapes. The text labels may indicate the topics corresponding to the geometric shapes, and each text label may be sized to fit within its respective geometric shape.

Finally, in block 814, device 200 may display the first plurality of geometric shapes, the second plurality of geometric shapes, and text labels. Device 200 may not display all text labels for the second plurality of geometric shapes when all of the first plurality of geometric shapes and their respective text labels are displayed. If one of the first plurality of geometric shapes is selected, device 200 may display the shapes that are in the second plurality of geometric shapes and that are within the selected geometric shape, along with the respective text labels.

Figure 9:
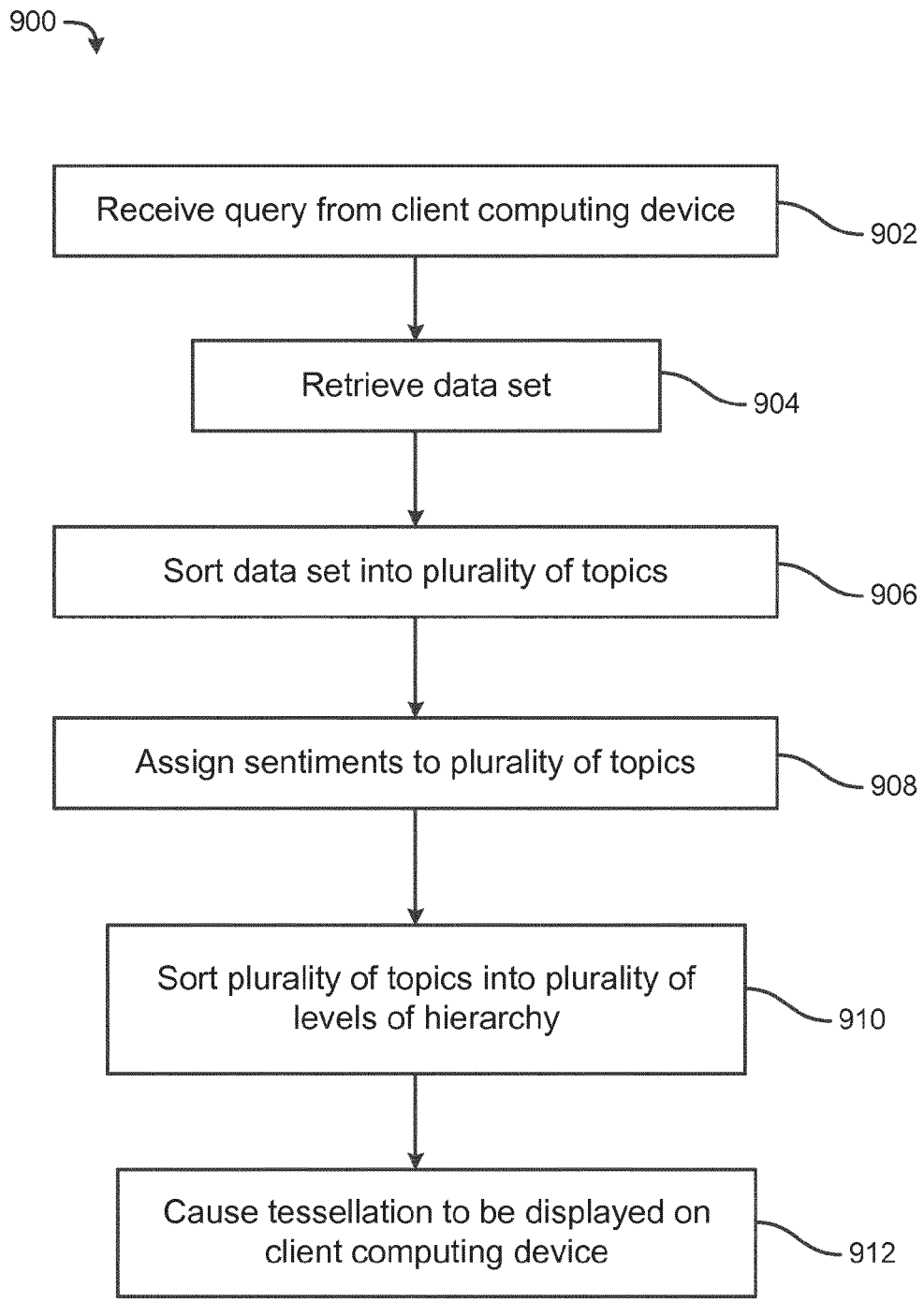
FIG. 9 is a flowchart of an example method for execution by a server apparatus for causing a visualization of a data set to be displayed on a client computing device.

FIG. 9 is a flowchart of an example method 900 for execution by a server apparatus for causing a visualization of a data set to be displayed on a client computing device. Although execution of method 900 is described below with reference to device 100 of FIG. 1, it should be understood that execution of method 900 may be performed by other suitable devices, such as server apparatus 300 or 450. Method 900 may be implemented in the form of executable instructions stored on a machine-readable storage medium, such as storage medium 104, and/or in the form of electronic circuitry.

Method 900 may start in block 902, where device 100 may receive a query from a client computing device. In block 904, device 100 may retrieve a data set that is related to the query. The data set may include documents that are tagged with sentiment tags, which may be based on sentiment analysis of the documents.

Next, in block 906, device 100 may sort the data set into a plurality of topics. Device 100 may read subject and/or keyword tags associated with documents in the data set to identify topics that are relevant to the documents, then group together documents that are relevant to the same topic. Device 100 may generate or read a cluster map of the documents in the data set, identify topics based on the cluster map, and determine which documents are relevant to each topic.

In block 908, device 100 may assign sentiments to the plurality of topics. The sentiments may be assigned based on sentiment tags associated with documents in the data set. Device 100 may read all sentiment tags associated with documents related to a topic, identify a sentiment that is indicated by a majority of such sentiment tags, and assign the sentiment to the topic.

In block 910, device 100 may sort the plurality of topics into a plurality of levels of hierarchy. Device 100 may identify a set of broad topics, as well as narrower topics (e.g., sub-topics) relevant to respective broad topics. Device 100 may assign the broad topics to a first level of hierarchy (e.g., the top level of hierarchy), and may assign the narrower topics to a second level of hierarchy. In some implementations, device 100 may assign topics to respective levels of hierarchy based on a hierarchical tree of the data set.

Finally, in block 912, device 100 may cause a tessellation to be displayed on a computing device. The tessellation may include a plurality of geometric shapes corresponding to the plurality of topics. Sizes of the plurality of geometric shapes may be proportional to the importance of the corresponding plurality of topics. The tessellation may be indicative of the assigned sentiments. For example, the plurality of geometric shapes may be colored based on sentiments assigned to the respective corresponding plurality of topics. The tessellation may have multiple levels of hierarchy corresponding to the plurality of levels of hierarchy of the topics. Shapes at a second level of hierarchy of the tessellation may be visible through shapes at a first level of hierarchy of the tessellation. Device 100 may transmit instructions for rendering the tessellation to a client computing device, which may execute the instructions and display the tessellation.

Figure 10:
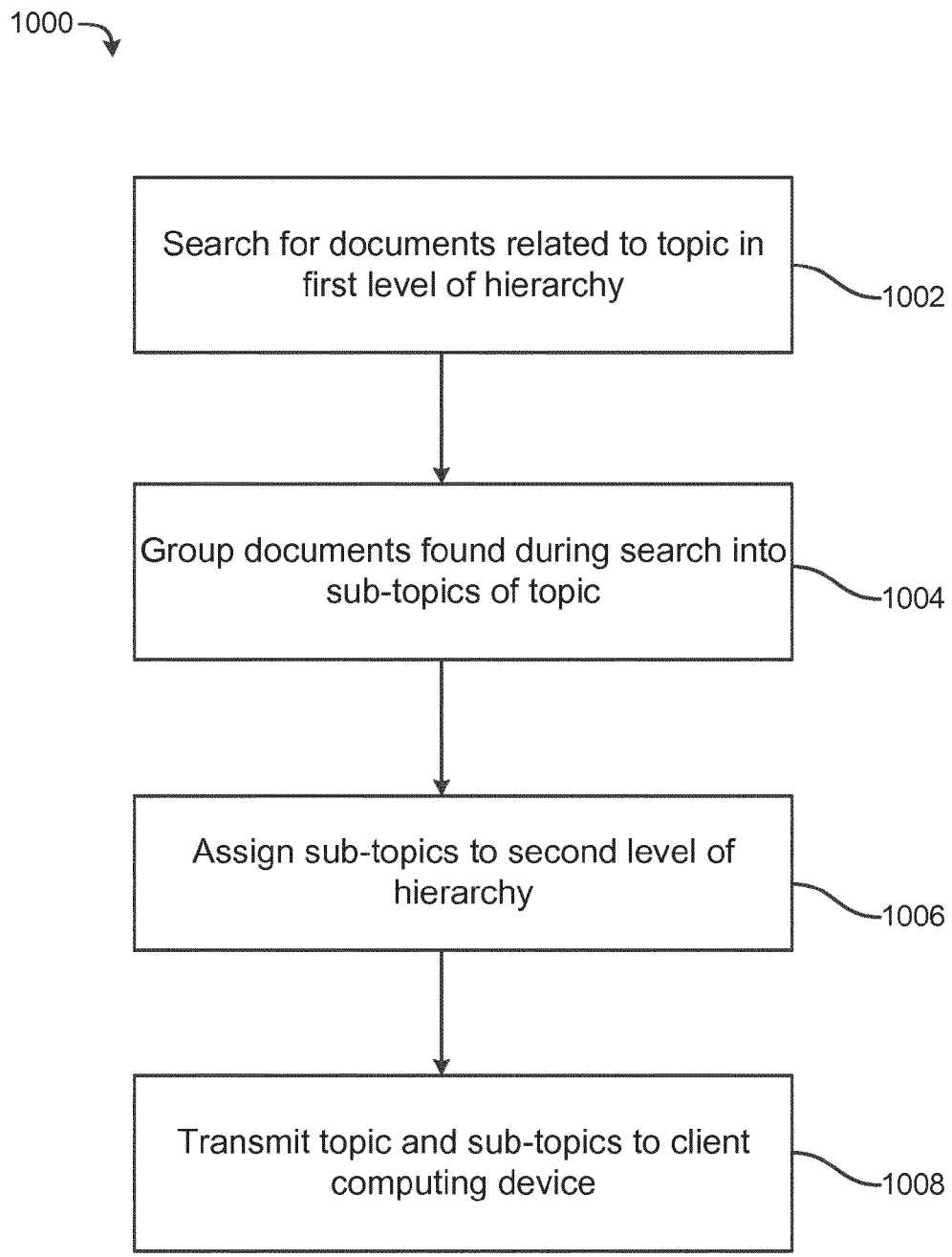
FIG. 10 is a flowchart of an example method for execution by a server apparatus for organizing information to send to a client computing device to enable generating a visualization of a data set.

FIG. 10 is a flowchart of an example method 1000 for execution by a server apparatus for organizing information to send to a client computing device to enable generating a visualization of a data set. Although execution of method 1000 is described below with reference to device 100 of FIG. 1, it should be understood that execution of method 1000 may be performed by other suitable devices, such as server apparatus 300 or 450. Method 1000 may be implemented in the form of executable instructions stored on a machine-readable storage medium, such as storage medium 104, and/or in the form of electronic circuitry.

Method 1000 may start in block 1002, where device 100 may search for documents related to a topic in a first level of hierarchy. Device 100 may search for documents within device 100, such as within a database on device 100, and/or on another device.

Next, in block 1004, device 100 may group documents found during the search of block 1002 into sub-topics of the topic. The sub-topics may be search results that are returned in response to a search for the topic. Device 100 may read subject and/or keyword tags associated with the documents to determine the sub-topics.

In block 1006, device 100 may assign the sub-topics to a second level of hierarchy. Finally, in block 1008, device 100 may transmit the topic and sub-topics to a computing device. The topic and sub-topics may be transmitted over a network, such as network 430.

The foregoing disclosure describes visualizations of data sets and implementations for rendering such visualizations. Example implementations described herein enable rendering of visualizations that summarize multiple aspects of data sets through sizing and spatial positioning of geometric shapes.

We claim:

1. A method for rendering, on a computing device, a visualization of a data set, the method comprising:
    identifying, in the data set, a first plurality of topics at a first hierarchical level;
    ranking the first plurality of topics in order of importance; and
    causing to be displayed, on the computing device, a tessellation having a plurality of hierarchical levels including the first hierarchical level, including:
        generating a first plurality of different geometric shapes, each of which corresponds to one of the first plurality of topics,
        generating different sizes for the first plurality of geometric shapes based on the ranking,
        including within each of the first plurality of geometric shapes, a respective visual indicator of a sentiment associated with each of the first plurality of topics,
        arranging the first plurality of geometric shapes into the tessellation by placing a largest geometric shape of the first plurality of different geometric shapes corresponding to a most important topic of the first plurality of topics at a corner of the tessellation, placing a second largest geometric shape of the first plurality of different geometric shapes adjacent to the largest geometric shape, and placing additional different geometric shapes of the first plurality of different geometric shapes adjacent to the second largest geometric shape in a row in a decreasing order of size,
    causing to display within at least one geometric shape of the first plurality of geometric shapes, a second plurality of geometric shapes, wherein the second plurality of geometric shapes respectively correspond to a plurality of sub-topics that are related to a topic of the first plurality of topics that corresponds to the at least one geometric shape, wherein at least one sub-topic of the plurality of sub-topics has a sentiment tag that differs from a sentiment tag associated with the topic and the second plurality of geometric shapes being initially displayed within the at least one geometric shape in the tessellation with a same visual indicator of sentiment as the at least one geometric shape.

2. The method of claim 1, wherein the visual indicator on each of the first plurality of geometric shapes comprises a color indicative of a sentiment associated with the respective one of the first plurality of topics; and
    the order of importance is based on how many documents in the data set are relevant to each of the first plurality of topics.

3. The method of claim 1, wherein at least one sub-topic of the plurality of sub-topics has a sentiment tag that differs from the sentiment tag of the topic includes multiple sub-topics of the plurality of sub-topics have respective sentiment tags that differ from the sentiment tag of the topic and the selection of the at least one geometric shape in the tessellation causes the second plurality of geometric shapes at a second hierarchical level to be displayed on the computing device, wherein:
    sizes of the second plurality of geometric shapes are based on a ranking of the second plurality of topics by importance; and
    each of the second plurality of geometric shapes comprises a visual indicator of the respective sentiment tag associated with the respective one of the second plurality of topics.

4. The method of claim 3, wherein the second plurality of geometric shapes tessellate within the selected one of the first plurality of geometric shapes.

5. The method of claim 1, further comprising:
    identifying vertexes on each geometric shape in the tessellation;
    applying contractionary and expansion forces to the vertexes while restricting movement of the vertexes, wherein the contractionary force pulls adjacent vertexes on each geometric shape in the tessellation towards each other, and the expansion force pushes all vertexes away from a centroid of the respective geometric shapes; and
    applying an exponentially-decaying multiplier to the contractionary and expansion forces.

6. A non-transitory machine-readable storage medium storing instructions that, when executed by a processor of a computing device for rendering a visualization of a data set including documents associated with a first plurality of topics, cause the processor to:
    generate a first plurality of different geometric shapes corresponding to the first plurality of topics at a first hierarchical level of the data set;
    generate different sizes for the first plurality of different geometric shapes based on a ranking of the first plurality of topics;
    arrange the first plurality of geometric shapes into a tessellation based on the sizes of the first plurality of geometric shapes, including placing a largest geometric shape of the first plurality of different geometric shapes corresponding to a most important topic of the first plurality of topics at a corner of the tessellation, placing a second largest geometric shape of the first plurality of different geometric shapes adjacent to the largest geometric shape, and placing additional different geometric shapes of the first plurality of different geometric shapes adjacent to the second largest geometric shape in a row in a decreasing order of size;
    obtain sentiment tags associated with the documents in the data set;
    visually indicate, in the tessellation, sentiments associated with the first plurality of topics;
    generate a second plurality of geometric shapes corresponding to a second plurality of topics at a second hierarchical level of the data set;
    causing to display within a selected geometric shape of the first plurality of geometric shapes, a subset of the second plurality of geometric shapes with the visual indicator corresponding to the selected geometric shape, wherein one or more of the second plurality of topics corresponding to the subset of geometric shapes have respective sentiment tags that differ from a sentiment tag associated with the topic corresponding to the selected geometric shape.

7. The non-transitory machine-readable storage medium of claim 6, wherein the instructions are to cause the processor to:

generate a treemap of the first plurality of topics;
identify vertexes of the treemap; and
split the treemap into the tessellation by applying forces to the vertexes while restricting movement of the vertexes.

8. The non-transitory machine-readable storage medium of claim 7, wherein forces applied to the vertexes comprise:
a contractionary force that pulls adjacent vertexes on each geometric shape in the tessellation towards each other, and
an expansion force pushing all vertexes away from a centroid of their respective geometric shapes.

9. The non-transitory machine-readable storage medium of claim 7, wherein the instructions are to cause the processor to apply an exponentially-decaying multiplier to the forces.

10. The non-transitory machine-readable storage medium of claim 6, wherein the instructions are to cause the processor to render text labels for the first plurality of geometric shapes, wherein each text label is sized to fit within its respective geometric shape.

11. The non-transitory machine-readable storage medium of claim 6, wherein the instructions are to cause the processor to:
display the first plurality of geometric shapes in a semi-transparent manner such that the second plurality of geometric shapes are visible under the first plurality of geometric shapes.

12. The non-transitory machine-readable storage medium of claim 11, wherein the second plurality of topics are related to one of the first plurality of topics, and wherein sizes of the second plurality of geometric shapes are based on importance of the corresponding second plurality of topics, the non-transitory machine-readable storage medium further comprising instructions to arrange remaining second plurality of geometric shapes other than the subset in a tessellation inside one or more of the first plurality of geometric shapes other than the selected geometric shape.

13. An apparatus for rendering a visualization of a data set, the apparatus comprising:
a processor; and
a memory storing instructions that when executed by the processor cause the processor to:
receive a query from a client computing device;
retrieve the data set, wherein the data set comprises documents related to the query, and wherein the documents are tagged with sentiment tags based on sentiment analysis of the documents;
sort the data set into a plurality of topics;
assign, based on the sentiment tags, sentiments to the plurality of topics;
sort the plurality of topics into a plurality of levels of hierarchy that include at least a first level of hierarchy and a second level of hierarchy wherein the first level of hierarchy include a plurality of topics and a plurality of sub-topics for at least one topic are assigned the second level of hierarchy;
generate different geometric shapes for the plurality of topics and the sub-topics in each hierarchical level;
generate different sizes for the geometric shapes based on a ranking of the plurality of topics and the sub-topics; and
arrange the geometric shapes of the plurality of topics into a tessellation by placing a largest geometric shape of the first plurality of different geometric shapes corresponding to a most important topic of the first plurality of topics at a corner of the tessellation, placing a second largest geometric shape of the first plurality of different geometric shapes adjacent to the largest geometric shape, and placing additional different geometric shapes of the first plurality of different geometric shapes adjacent to the second largest geometric shape in a row in a decreasing order of size;
tessellate geometric shapes corresponding to the sub-topics within a geometric shape corresponding to the topic that is at the first level of hierarchy wherein the sentiment tag of at least one of the sub-topics differs from the sentiment tag associated with the topic and the second plurality of geometric shapes being initially displayed within the geometric shape corresponding to the topic with a same visual indicator of sentiment as the geometric shape; and
cause the tessellation to be displayed on the client computing device.

14. The apparatus of claim 13, wherein the processor is further to:
group documents found during the search into sub-topics of the topic; and
transmit the topic and the sub-topics to the client computing device.

15. The apparatus of claim 13, wherein the instructions are to cause the processor to:
identify vertexes on each geometric shape in the tessellation;
apply contractionary and expansion forces to the vertexes while restricting movement of the vertexes, wherein the contractionary force pulls adjacent vertexes on each geometric shape in the tessellation towards each other, and the expansion force pushes all vertexes away from a centroid of the respective geometric shapes; and
apply an exponentially-decaying multiplier to the contractionary and expansion forces.

16. The apparatus of claim 13, wherein the instructions to display the second plurality of geometric shapes within the geometric shape cause the processor to:
upon selection of the geometric shape,
cause a display of each of the second plurality of geometric shapes with respective visual indicators of sentiments wherein at least one respective visual indicator of sentiment of at least one of the second plurality of geometric shapes is different from the visual indicator of sentiment of the geometric shape that corresponds to the topic.

17. The apparatus of claim 16, wherein the visual indicators of sentiments include colors, patterns or icons.

18. The apparatus of claim 16, wherein the sentiments associated with the plurality of sub-topics include one or more of positive sentiment, negative sentiment, sad, entertaining and happy.

* * * * *